(12) United States Patent
MacCallum

(10) Patent No.: US 11,338,896 B2
(45) Date of Patent: May 24, 2022

(54) AEROSPACE BALLOON SYSTEM AND METHOD OF OPERATION

(71) Applicant: Space Perspective Inc., Kennedy Space Center, FL (US)

(72) Inventor: Taber MacCallum, Kennedy Space Center, FL (US)

(73) Assignee: Space Perspective Inc., Kennedy Space Center, FL (US)

( * ) Notice: Subject to any disclaimer, the term of this patent is extended or adjusted under 35 U.S.C. 154(b) by 0 days.

(21) Appl. No.: 17/162,151

(22) Filed: Jan. 29, 2021

(65) Prior Publication Data

US 2021/0237842 A1 Aug. 5, 2021

Related U.S. Application Data

(60) Provisional application No. 62/969,447, filed on Feb. 3, 2020.

(51) Int. Cl.

| | | |
|---|---|---|
| *B64B 1/44* | (2006.01) | |
| *B64B 1/40* | (2006.01) | |
| *B64D 1/12* | (2006.01) | |
| *B64B 1/64* | (2006.01) | |
| *B64D 17/18* | (2006.01) | |
| *B64D 11/00* | (2006.01) | |

(52) U.S. Cl.
CPC ............... *B64B 1/44* (2013.01); *B64B 1/40* (2013.01); *B64B 1/64* (2013.01); *B64D 1/12* (2013.01); *B64D 11/00* (2013.01); *B64D 17/18* (2013.01); *B64D 2011/0061* (2013.01)

(58) Field of Classification Search
CPC ................ B64B 1/40; B64B 1/62; B64B 1/64
See application file for complete search history.

(56) References Cited

U.S. PATENT DOCUMENTS

| | | |
|---|---|---|
| 4,402,476 A | 9/1983 | Wiederkehr |
| 4,651,956 A | 3/1987 | Winker et al. |
| 9,346,531 B1 | 5/2016 | Washburn et al. |
| 9,463,862 B2 | 10/2016 | Ratner et al. |
| 9,540,091 B1 | 1/2017 | Maccallum et al. |
| 9,694,910 B2 | 7/2017 | Maccallum et al. |
| 9,908,609 B1 | 3/2018 | Fourie |
| 2005/0224639 A1* | 10/2005 | Kavanagh ................ B64B 1/64 244/31 |
| 2006/0000945 A1 | 1/2006 | Voss |
| 2014/0203135 A1* | 7/2014 | Walter ..................... B64B 1/64 244/31 |
| 2016/0264248 A1 | 9/2016 | Maccallum et al. |
| 2017/0129579 A1 | 5/2017 | De Jong |
| 2017/0297724 A1 | 10/2017 | Leidich et al. |
| 2017/0331177 A1 | 11/2017 | Maccallum et al. |

\* cited by examiner

*Primary Examiner* — Richard R. Green
(74) *Attorney, Agent, or Firm* — Jeffrey Schox; Samuel Rosenthal

(57) ABSTRACT

A balloon system, preferably including a balloon and a payload. A balloon, preferably including a plurality of gores, a plurality of load members, and an apex fitting. A method of balloon system operation, preferably including deflating a balloon, and optionally including operating the balloon system in flight and/or landing the balloon system.

23 Claims, 6 Drawing Sheets

AEROSPACE BALLOON SYSTEM AND METHOD OF OPERATION

CROSS-REFERENCE TO RELATED APPLICATIONS

This application claims the benefit of U.S. Provisional Application Ser. No. 62/969,447, filed on 3 Feb. 2020, which is incorporated in its entirety by this reference.

TECHNICAL FIELD

This invention relates generally to the aerospace vehicle field, and more specifically to a new and useful aerospace balloon system and method of operation.

BACKGROUND

Stratospheric balloons are typically deflated rapidly from a state in which they are substantially fully inflated. However, such deflation typically must be performed at high altitude (e.g., close to the maximum altitude reached by the balloon during flight), as higher atmospheric pressures at lower altitudes will typically act to partially deflate balloons. Thus, there is a need in the aerospace vehicle field to create a new and useful aerospace balloon system and method of operation.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
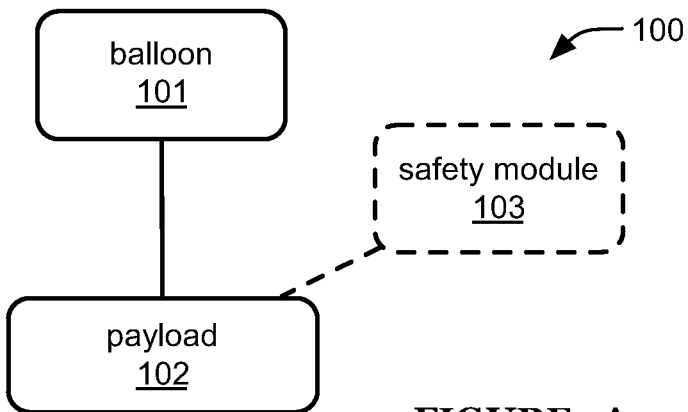
FIG. 1A is a schematic representation of an embodiment of a balloon system.
Figure 1B:
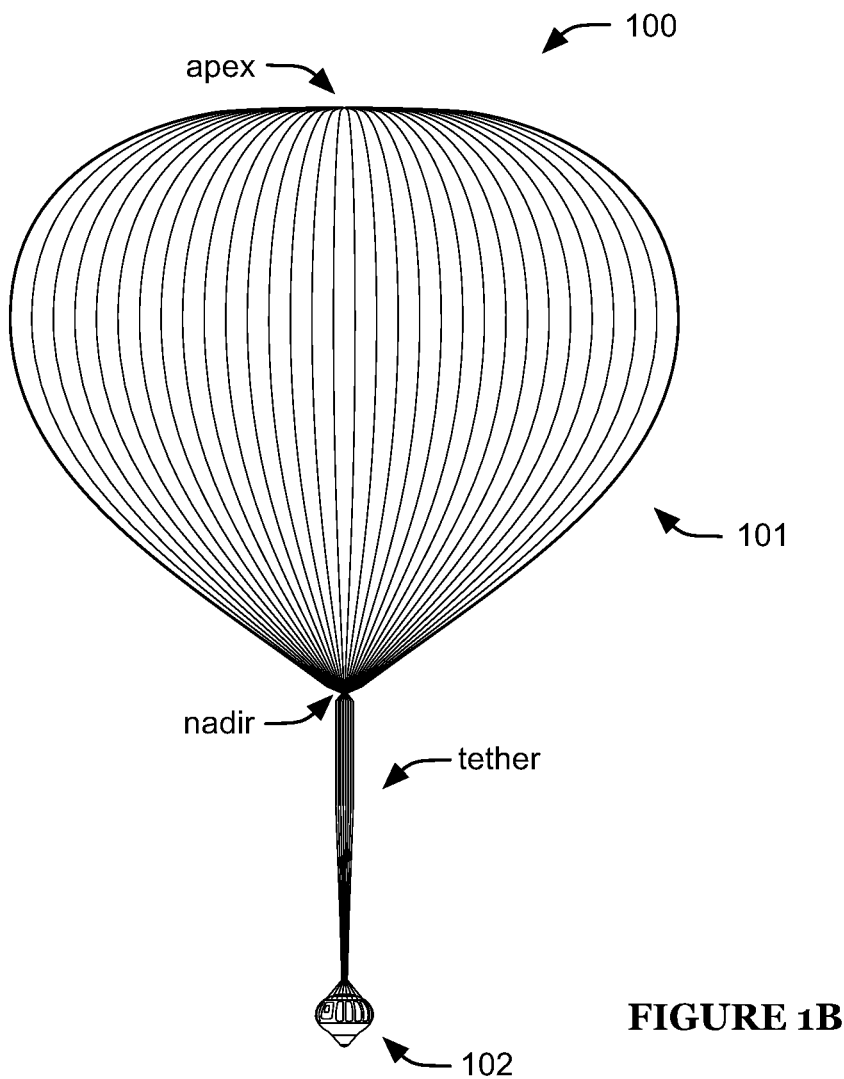
FIG. 1B is a side view of an example of the balloon system.
Figure 6:
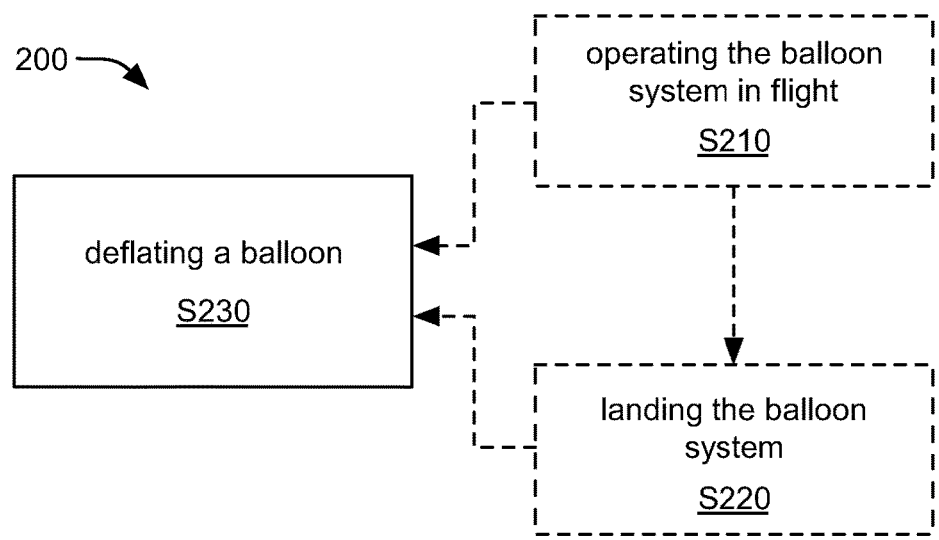
FIG. 6 is a schematic representation of an embodiment of a method of balloon system operation.
Figure 7:
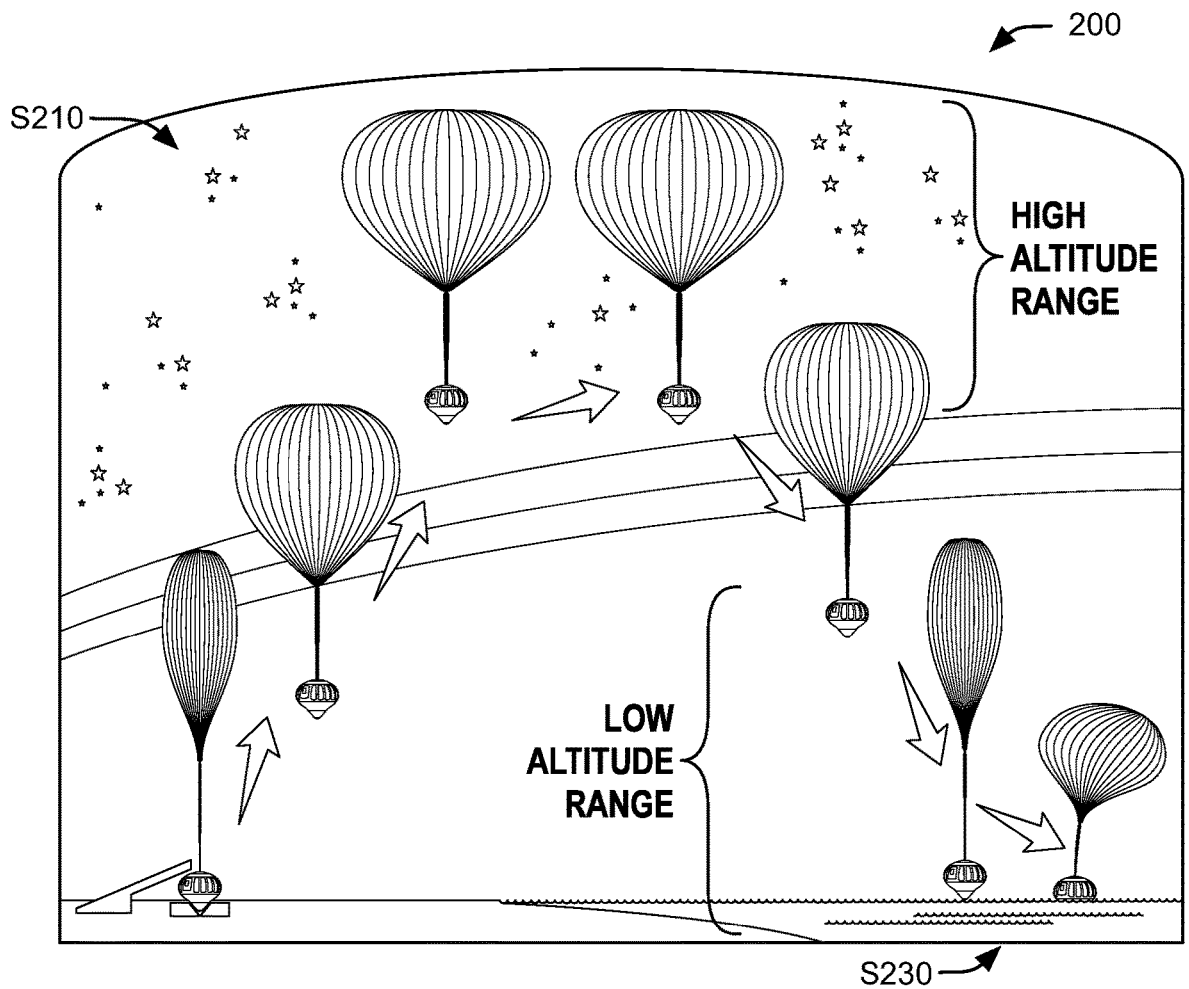
FIG. 7 is a schematic representation of an example of the method.

A balloon system 100 preferably includes a balloon 101 and a payload 102, and can optionally include a safety module 103 (e.g., as shown in FIGS. 1A-1B). However, the balloon system 100 can additionally or alternatively include any other suitable elements in any suitable arrangement. A method 200 of balloon system operation preferably includes deflating a balloon S230, and can optionally include operating a balloon system in flight S210 and/or landing the balloon system S220 (e.g., as shown in FIGS. 6-7). However, the method 200 can additionally or alternatively include any other suitable elements performed in any suitable manner.

2. Benefits

Embodiments of the balloon system 100 and/or method 200 can confer one or more benefits. In some embodiments, the system and/or method can enable safe and/or rapid balloon deflation (e.g., deflation of partially inflated balloons at low altitudes, such as at or near ground level). First, in some embodiments, the system and/or method can reduce the likelihood of deleterious and/or dangerous interactions between portions of the balloon after deflation has been initiated. In typical balloon systems, deflation of some balloons (e.g., partially inflated balloons at low altitudes) can be subject to interactions such as folding and/or creasing (which can slow and/or prevent the venting of lift gases contained within the balloon, and/or can allow air to enter the balloon, where it may mix with the lift gases contained therein). Further, some such systems can be subject to interactions such as flapping and/or rubbing (e.g., which can cause electric charge buildup, potentially resulting in phenomena such as arcing, which may have the capacity to ignite lift gases in and/or near the balloon). Accordingly, it can be beneficial to reduce the likelihood of such interactions (and/or any other potentially negative interactions). Embodiments of the system and/or method can ensure rapid venting of the lift gas (e.g., thereby diluting a flammable lift gas, such as hydrogen, to a safe concentration at which explosion is unlikely or impossible). However, the system and/or method can additionally or alternatively confer any other suitable benefits.

3. Balloon System

The balloon system 100 is preferably a balloon-based aerospace vehicle (e.g., balloon-propelled space capsule), such as a balloon-propelled vehicle configured to operate in the troposphere, stratosphere, and/or any other suitable atmospheric layers. However, the system can additionally or alternatively be any other suitable lighter-than-air vehicle or aerostat (e.g., airship), space vehicle (e.g., spacecraft and/or space capsule, such as a rocket-propelled space vehicle), aerodyne (e.g., fixed- and/or rotary-wing aircraft), any other suitable aerospace vehicle, and/or any other suitable system configured to operate in a low- or no-pressure environment (e.g., low-pressure as compared with human-survivable pressures, such as environments at high altitude, in outer space, on or near extraterrestrial planetary surfaces and/or surfaces of other celestial bodies such as Mars or the Moon, etc.). In alternate embodiments, the system can additionally or alternatively function as a terrestrial vehicle, a watercraft, and/or any other suitable vehicle.

The system 100 can optionally include one or more elements such as described in U.S. Provisional Patent Application 62/969,447, filed 3 Feb. 2020 and titled "Space Capsule", which is herein incorporated in its entirety by this reference. In examples, the balloon 101 can include one or more elements described in U.S. Provisional Patent Application 62/969,447 regarding the 'Balloon System', the payload 102 can include one or more elements described in U.S. Provisional Patent Application 62/969,447 regarding the 'Capsule System' and/or 'Avionics and Power', and/or the safety module 103 can include one or more elements described in U.S. Provisional Patent Application 62/969,447 regarding the 'Backup Descent System'. However, the system 100 can additionally or alternatively include any other suitable elements described in U.S. Provisional Patent Application 62/969,447.

3.1 Balloon

Figure 2A:
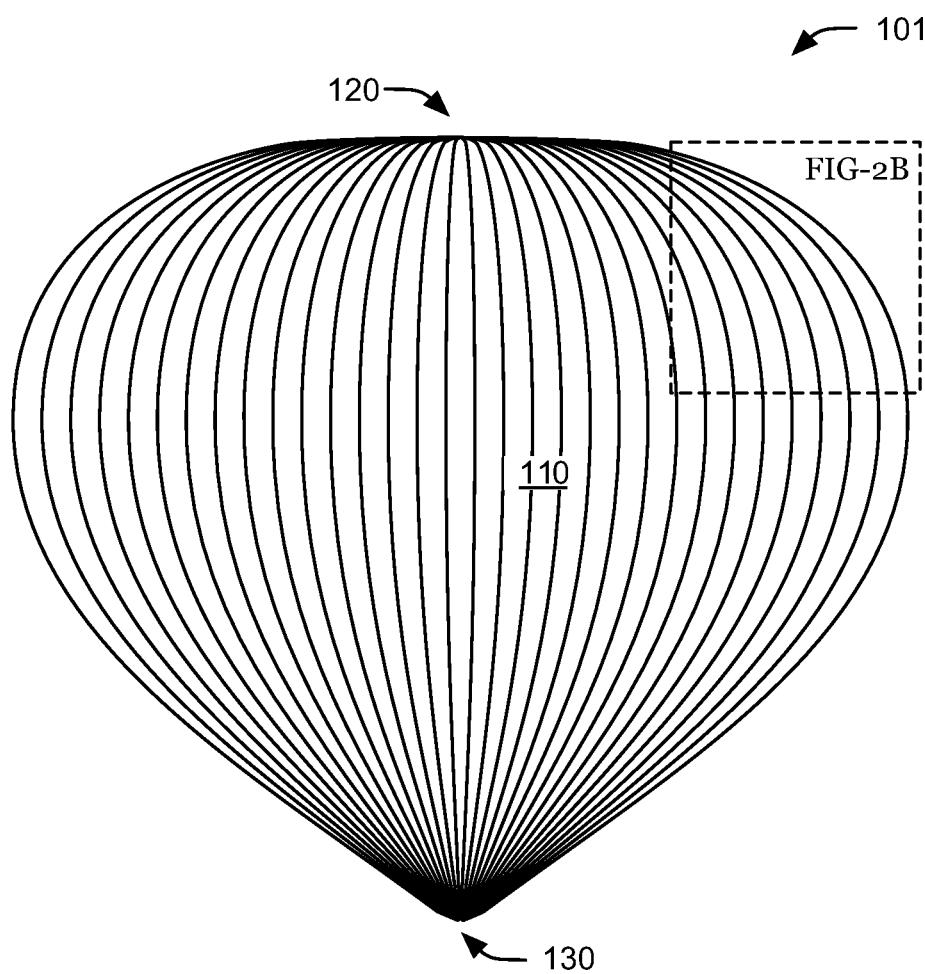
FIG. 2A is a side view of a balloon of the example depicted in FIG. 1B.

The balloon 101 preferably includes an envelope 110 and an apex fitting 120, and can optionally include a nadir fitting 130 and/or any other suitable elements (e.g., as shown in FIG. 2A). The balloon 101 preferably defines an apex and a nadir. When inflated and in flight, the apex is arranged at (or substantially at) the top of the balloon (e.g., with respect to a gravity vector), and the nadir is arranged at (or substantially at) the bottom of the balloon (e.g., opposing the apex across the balloon along or substantially along the gravity vector). The balloon can be a zero-pressure balloon, a super-pressure balloon, and/or any other suitable type of balloon.

3.1.1 Envelope

The envelope 110 preferably functions to contain a lighter-than-air fluid (e.g., lift gas, such as helium, molecular hydrogen, etc.). The envelope preferably contains enough fluid to fully or substantially fully inflate the balloon while it is operating at or near the maximum altitude of a flight. Further, the envelope 110 preferably functions to isolate this lighter-than-air fluid from the surrounding atmosphere (e.g., preventing mixing of oxygen-containing air with the fluid contained within the envelope).

In some embodiments, the balloon will typically be partially deflated at lower altitudes, due to the significantly increased atmospheric pressure at lower altitudes. For example, if the balloon is a zero-pressure balloon (e.g., in which the lighter-than-air fluid is at substantially the same pressure as the atmosphere surrounding the balloon), then the balloon will typically be partially inflated substantially in proportion to a pressure ratio between the lowest atmospheric pressure encountered during flight (e.g., at the highest altitude attained during flight), or alternatively, an atmospheric pressure at which the balloon will be fully inflated, divided by the present atmospheric pressure at the balloon (e.g., at the balloon's current altitude). For example, if the atmospheric pressure at the balloon's highest altitude (at which the balloon was fully inflated) is $\frac{1}{20}$ that of the atmospheric pressure at the balloon's current altitude, then at the current altitude, the balloon will typically be approximately $\frac{1}{20}=5\%$ inflated. In examples, the balloon volume ratio (e.g., current balloon volume divided by volume of the fully-inflated balloon) and/or pressure ratio (e.g., lowest atmospheric pressure exerted on the balloon divided by the current atmospheric pressure) can be less than 1%, 2%, 3%, 5%, 10%, 15%, 20%, 30%, 0.1-1%, 1-2%, 2-5%, 5-10%, 10-20%, 20-30%, 30-50%, or greater than 50%.

Figure 2B:
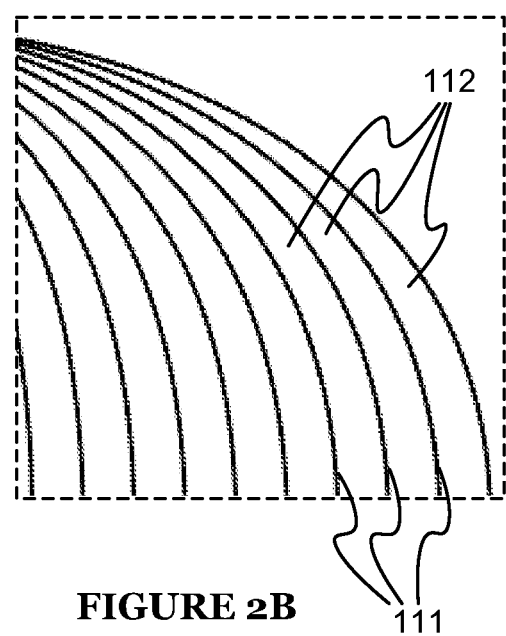
FIG. 2B is a detail view of a portion of FIG. 2A.
Figure 3:
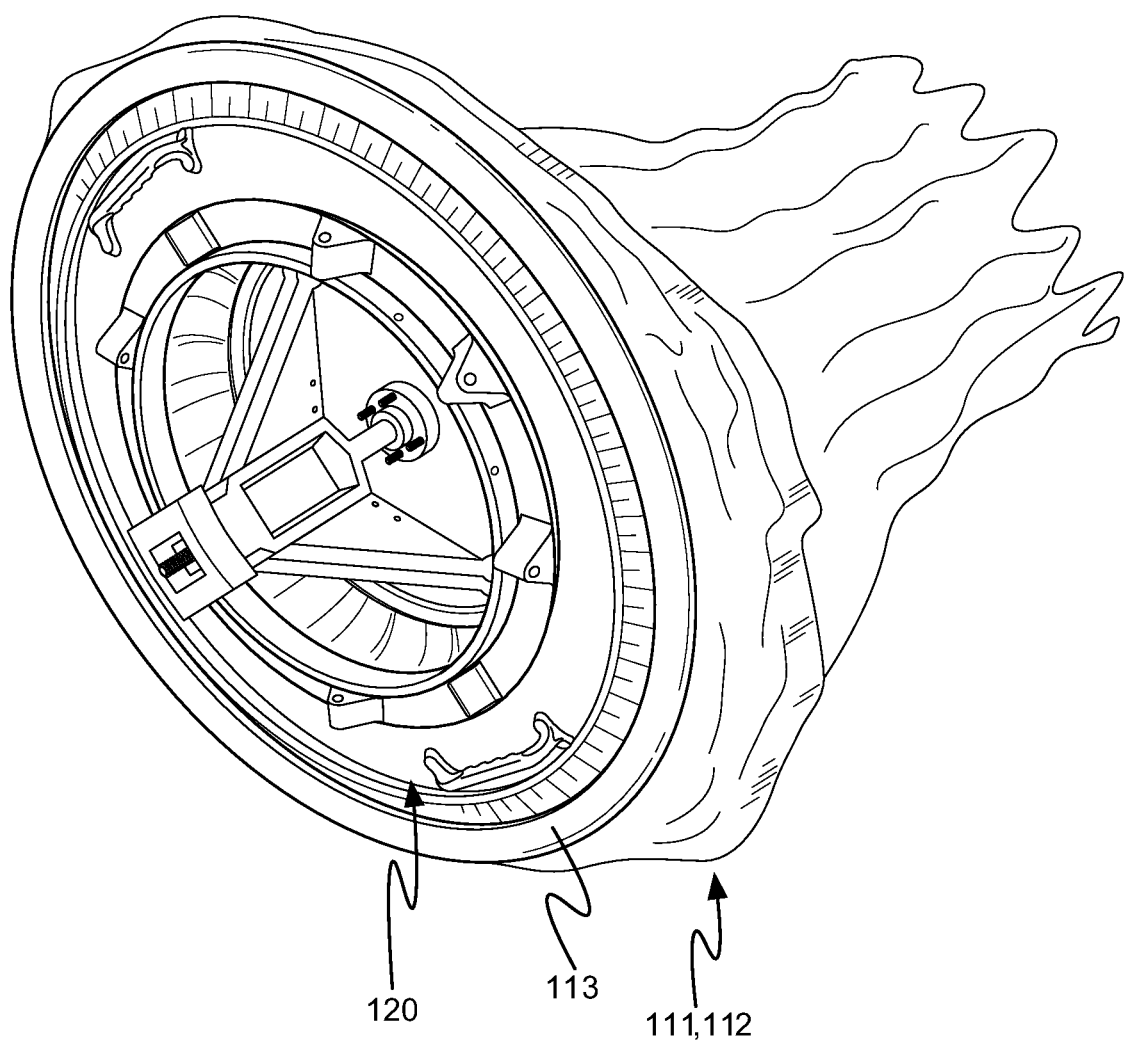
FIG. 3 is a perspective view of a portion of a specific example of the balloon.

The envelope 110 preferably includes one or more gores 111 and load members 112, and can optionally include one or more reinforcement elements 113 (e.g., as shown in FIGS. 2B and/or 3).

The gores 111 preferably define the majority of the surface of the envelope 110. Each gore is preferably an elongated element defining an apex end and a nadir end opposing the apex end along the length of the gore. Each gore preferably runs substantially the entire length of a half meridian of the envelope (e.g., from apex to nadir) but can alternatively have any other suitable length and/or arrangement. The gores preferably include (e.g., are made of) a polymer film (e.g., polyethylene) but can additionally or alternatively include any other lightweight materials and/or any other suitable materials.

The load members 112 preferably function to mechanically connect the gores along their length (e.g., from apex end to nadir end), more preferably sealing the seam between adjacent gores along its length. The load members 112 can additionally or alternatively function to carry mechanical loads (e.g., tensile loads) in the balloon, such as loads between the apex fitting 120 and nadir (e.g., nadir fitting 130). Each load member can define an apex end and a nadir end opposing the apex end along the length of the load member. The load members preferably include load tape, but can additionally or alternatively include any elements capable of sealing the envelope between the gores and/or carrying tensile loads (e.g., meridional tension). However, the load members 112 can additionally or alternatively include any other suitable elements in any suitable arrangement.

The reinforcement elements 113 are preferably arranged at and/or near the envelope boundaries (e.g., where the envelope meets and/or attaches to fittings, such as the apex fitting 120 and/or nadir fitting 130). For example, the envelope can include one or more reinforcement elements arranged around the border of the apex fitting, such as where the envelope attaches to the fitting (e.g., wherein the fitting attaches to the reinforcement elements). These reinforcement elements can include additional load tape, balloon materials such as the materials including the gores, and/or any other suitable materials.

However, the envelope 110 can additionally or alternatively include any other suitable elements in any suitable arrangement, and/or can alternatively be of unitary construction (e.g., made of a single piece of material, such as a polymer film).

3.1.2 Apex Fitting

The apex fitting 120 preferably functions to mechanically couple (e.g., connect) elements of the envelope (e.g., load members, gores, reinforcement elements, etc.) at or near the balloon apex. The apex fitting can further function to controllably decouple elements of the envelope from each other (e.g., to initiate balloon deflation). The apex fitting is preferably arranged at and/or near the balloon apex (e.g., at an aperture defined in the envelope 110 around the balloon apex), but can additionally or alternatively have any other suitable arrangement.

Figure 4A:
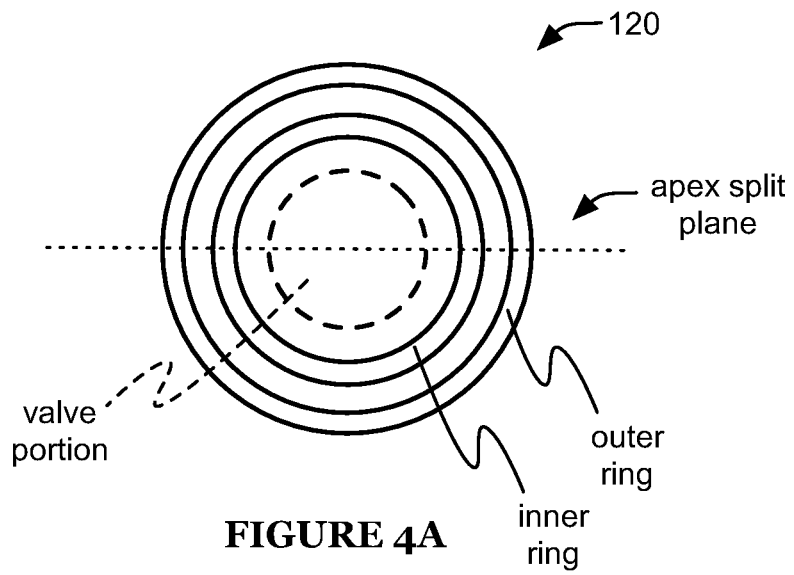
FIG. 4A is a top view of an example of an apex fitting of the balloon system.
Figure 4B:
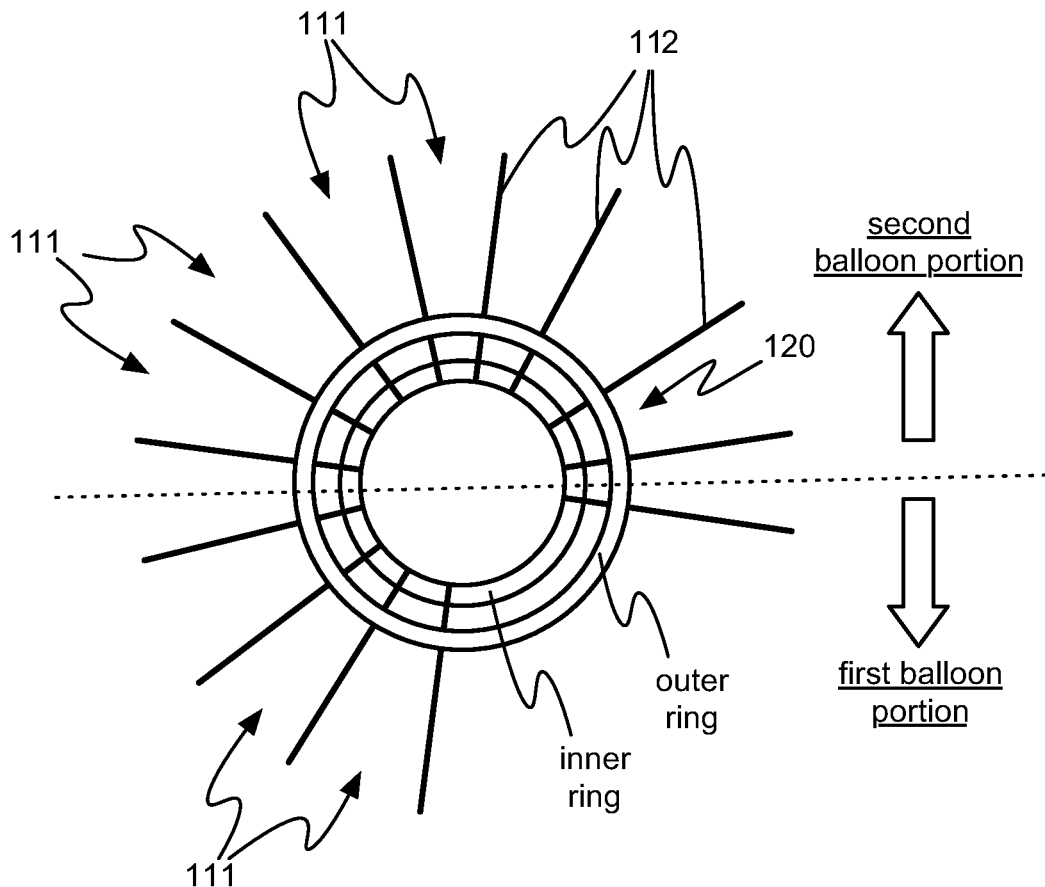
FIGS. 4B-4C are top views of a portion of a first and second example, respectively, of the balloon.
Figure 4C:
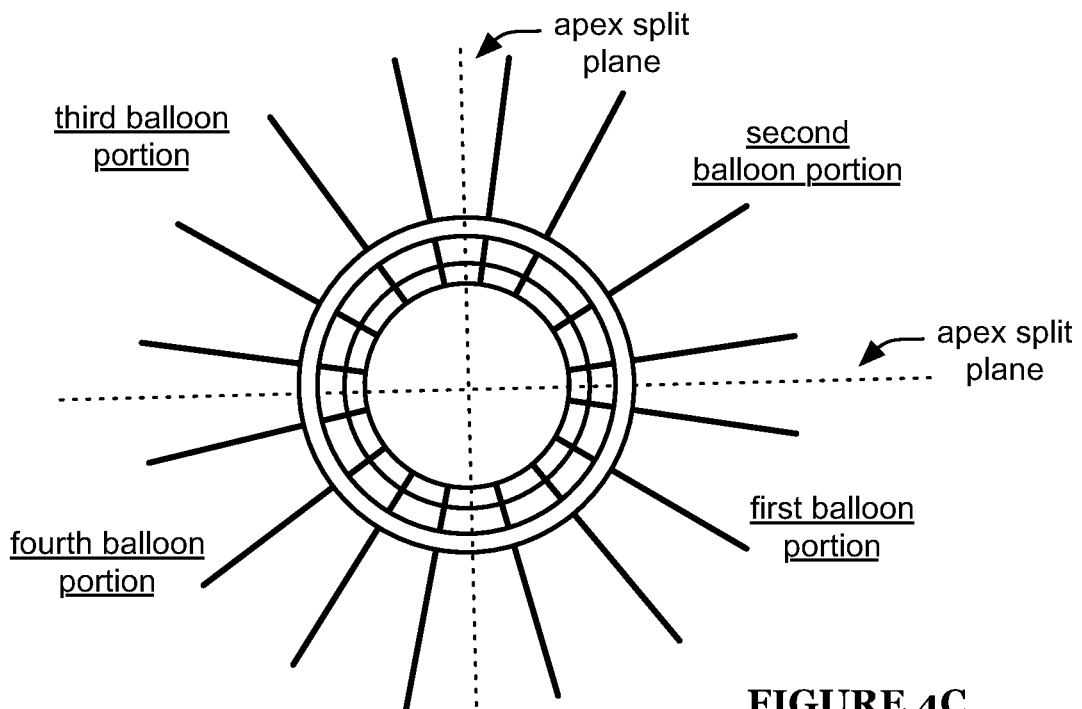

The apex fitting 120 is preferably configured to attach to the envelope no, such as by mechanically coupling to elements of the envelope (e.g., elements such as gores, load members, and/or reinforcement elements, etc.). In examples, the apex fitting can clamp onto envelope elements, be adhered to envelope elements, be mechanically coupled to envelope elements by friction, be attached to envelope elements by ties and/or fasteners, and/or mechanically couple to elements of the envelope in any other suitable manner. In one example (e.g., as shown in FIGS. 4A-4C), elements of the envelope (e.g., load members 112) are clamped between concentric rings of the apex fitting. The apex fitting preferably forms a seal with the envelope (e.g., wherein the apex fitting fits into and seals an aperture in the envelope), but can alternatively couple to the envelope in any other suitable manner.

The apex fitting 120 is preferably configured to hold one or more elements (e.g., load members) of the balloon in tension (e.g., when configured in a first mode). When substantial tensile loads (e.g., meridional tension) exists in the balloon, these loads are preferably carried by the load members (but can additionally or alternatively be carried by the gores and/or any other suitable elements of the balloon). These loads can arise due to forces exerted on the envelope by retaining lift gas (e.g., when inflated), due to supporting a payload (e.g., payload carried by the balloon, such as tethered to the balloon nadir), and/or arising from any other suitable forces exerted on the balloon. The apex fitting preferably retains the load member apex ends at or near the balloon apex, accepting tensile loads from the load members and thereby holding the load members in tension when such tensile loads exist.

The apex fitting is preferably configured to split apart the balloon at or near the apex (e.g., when transitioning from the first mode to a second mode). Different portions of the balloon are preferably attached separately to the apex fitting (e.g., attached to separate portions of the apex fitting). These balloon portions can include subsets (e.g., contiguous subsets) of envelope elements (e.g., gores, load members, reinforcement elements, etc.), such as shown by way of examples in FIGS. 4B and/or 4C. The apex fitting is preferably attached separately to a plurality of balloon portions, preferably two balloon portions but alternatively more than two (e.g., 3, 4, 6, 8, 5-10, or more than 10 portions).

Figure 5:
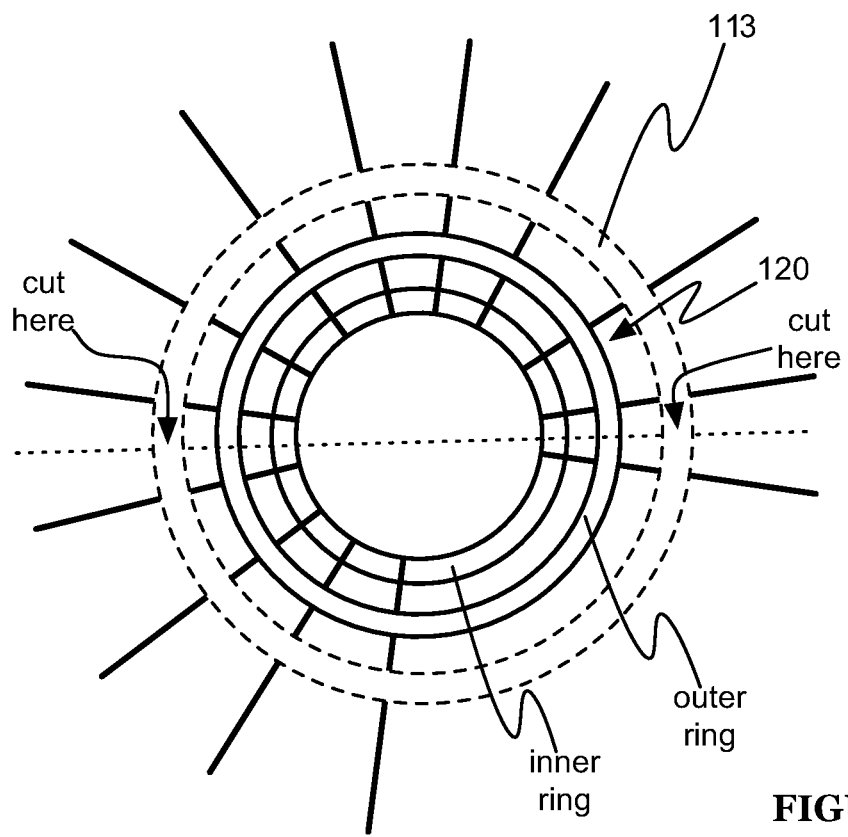
FIG. 5 is a schematic representation of cut locations in a portion of a third example of the balloon.

The apex fitting is preferably operable to separate (e.g., mechanically decouple) the different balloon portions from each other. In a first example, this decoupling can be achieved by splitting the apex fitting into multiple pieces (e.g., each connected to a different balloon portion), such as by mechanically decoupling the pieces of the apex fitting from each other (e.g., wherein the tensile load pulls apart the multiple pieces in response to the decoupling). In a second example, this decoupling can be achieved by releasing the mechanical connection to one or more of the balloon portions, such as by releasing a clamp on the balloon portion and/or by cutting the envelope. These envelope cuts can include circumferential cuts (e.g., around the apex fitting), such as cutting one or more load members (and/or gores, reinforcement elements, etc.) at or near the boundary of the apex fitting. Additionally or alternatively, these cuts can include non-circumferential cuts, such as cuts directed along (or substantially along) a meridian of the balloon, outward (e.g., radially outward) from the apex fitting, and/or in any other suitable directions. For example, this can include cutting one or more reinforcement elements (e.g., circumferential reinforcement elements), preferably at and/or near the boundary between balloon portions (e.g., as shown in FIG. 5). However, the apex fitting can additionally or alternatively separate the balloon portions from each other in any other suitable manner.

In one example, in which the envelope includes reinforcement elements at and/or near the apex fitting (e.g., circumferential reinforcement elements at the location where the apex fitting couples to the envelope), splitting the balloon apart (e.g., transitioning to the second mode) can include both separating the balloon portions (e.g., splitting the apex fitting in two pieces, wherein each piece is connected to a different balloon portion) and cutting the reinforcement elements. The reinforcement elements are preferably cut substantially at the boundary between balloon portions, but can additionally or alternatively be cut at any other suitable location. Cutting the balloon envelope (e.g., reinforcement elements) in this manner can include severing one or more balloon elements entirely, can include partially cutting one or more balloon elements (e.g., starting a tear from an edge of the balloon), and/or can include cutting the balloon envelope in any other suitable manner.

The apex fitting can include one or more actuators configured to separate the balloon portions (e.g., separate the apex fitting pieces from each other, separate balloon portions from the apex fitting, etc.). The separation of balloon portions is preferably achieved without creating sparks and/or introducing other potential sources of ignition (e.g., to avoid igniting hydrogen contained within the balloon). Accordingly, the actuator(s) preferably do not introduce any such potential ignition sources; for example, the apex fitting actuator(s) can include one or more wax motors. However, the separation can additionally or alternatively be achieved in any other suitable manner.

In response to separating the balloon portions at the apex fitting, tensile loads present in the balloon will preferably cause the balloon portions to further separate (e.g., ripping apart from each other, possibly ripping gores and/or separating gores from each other at the seams). Accordingly, the balloon will open (e.g., at or near the apex), and the lighter-than-air fluid contained within will vent from the balloon. However, the apex fitting can additionally or alternatively cause the balloon to open in any other suitable manner.

The apex fitting can optionally include one or more crown valves and/or other elements (e.g., as described in U.S. Provisional Patent Application 62/969,447, filed 3 Feb. 2020 and titled "Space Capsule", which is herein incorporated in its entirety by this reference, such as described in U.S. Provisional Patent Application 62/969,447 regarding the 'Crown Valve'). Such elements can function to control partial venting of lift gas (e.g., to initiate balloon descent). In one example, the apex fitting includes an attachment portion and a valve portion, such as wherein the attachment portion of the apex fitting attaches to (e.g., seals to) the envelope and surrounds (e.g., circumferentially surrounds) the valve portion. However, the valve(s) can additionally or alternatively have any other suitable arrangement within the apex fitting (and/or elsewhere in the balloon), and/or the apex fitting can include no such valves.

3.1.3 Nadir Fitting

The balloon can optionally include a nadir fitting 130. The nadir fitting can mechanically couple (e.g., connect) elements of the envelope (e.g., load members, gores, reinforcement elements, etc.) at or near the balloon nadir. The nadir fitting can couple to the envelope in a manner substantially analogous to the apex fitting but can additionally or alternatively couple to the envelope in any other suitable manner.

However, the nadir fitting 130 and/or balloon 101 can additionally or alternatively include any other suitable elements in any suitable arrangement.

3.2 Payload

The balloon system can optionally include one or more payloads 102. The payload is preferably mechanically connected to the balloon (e.g., by a tether, rigid mechanical connection, etc.). The payload is preferably connected to the balloon proximal to the balloon nadir (e.g., at the nadir fitting 130). In some examples, this connection can be a releasable connection (e.g., can be operable to transition from a connected configuration to a released configuration in which the mechanical connection between the payload and balloon is separate).

The payload 102 preferably includes a capsule (e.g., for containing human passengers), but can additionally or alternatively include any other suitable elements. In examples, the payload 102 can include one or more elements such as described in U.S. Provisional Patent Application 62/969, 447, filed 3 Feb. 2020 and titled "Space Capsule", which is herein incorporated in its entirety by this reference (e.g., as described in U.S. Provisional Patent Application 62/969,447 regarding the 'Capsule System').

3.3 Safety Module

The system can optionally include one or more safety modules 103, such as parachutes, auxiliary propulsion systems (e.g., rockets such as retrorockets, propellers, jet engines, etc.), flight control surfaces (e.g., surfaces, such as fixed and/or rotary wings, including rigid wings, parasail wings, and/or any other suitable wings, rudders, ailerons, and/or elevators, configured to control vehicle flight, such as powered or unpowered descent, in operation as an aerodyne), and/or any other suitable elements. The safety module can function to slow descent of the system (e.g., in circumstances in which the propulsion module is not able to sufficiently slow system descent on its own, in circumstances in which the propulsion module fails and/or is detached from the capsule, etc.), can function to reposition the system (e.g., redirect capsule trajectory to ensure a water landing rather than a terrestrial landing), and/or can function to provide safety (e.g., backup safety) for the system in any other suitable manner. The system can additionally or alternatively include any other suitable elements (e.g., as described in U.S. Provisional Patent Application 62/969,447, filed 3 Feb. 2020 and titled "Space Capsule", which is herein incorporated in its entirety by this reference, such as described regarding the 'Backup Descent System').

However, the balloon system 100 can additionally or alternatively include any other suitable elements in any suitable arrangement.

4. Method

The method 200 for balloon system operation is preferably performed using the balloon system 100 described above. However, the method 200 can additionally or alternatively be performed using any other suitable systems.

The method 200 can optionally include one or more elements such as described in U.S. Provisional Patent Application 62/969,447, filed 3 Feb. 2020 and titled "Space Capsule", which is herein incorporated in its entirety by this reference. For example, deflating the balloon S230 can include one or more elements described in U.S. Provisional Patent Application 62/969,447 regarding 'Termination and Deflation'. Additionally or alternatively, operating the balloon system in flight S210 and/or landing the balloon system S220 can include one or more elements described in U.S. Provisional Patent Application 62/969,447 regarding 'Launch and Recovery' and/or 'Buoyancy control'. However, the method 200 can additionally or alternatively include any other suitable elements described in U.S. Provisional Patent Application 62/969,447.

4.1 Operating the Balloon System in Flight

The method can optionally include operating the balloon system in flight S210. During performance of S210, the balloon is preferably inflated with a lighter-than-air fluid (e.g., lift gas, such as hydrogen, helium, etc.). The balloon can be partially inflated, fully or substantially fully inflated, and/or have any other suitable inflation state.

S210 can include one or more of: taking off, ascending, maintaining altitude, maneuvering, descending, and/or any other suitable flight activities (e.g., as shown in FIG. 7, in which a person of skill in the art will recognize that the balloon system is not shown to scale with changes in altitude, but rather that the changes in altitude are far greater than the overall height of the balloon system).

In some embodiments, S210 includes ascending to and/or remaining within a high altitude range. This ascent is made from a lower altitude range, preferably a tropospheric altitude range, such as at or near the Earth's surface. In the low altitude range, the balloon is preferably partially inflated with the lighter-than-air fluid (e.g., wherein higher atmospheric pressures in this low altitude range prevent expansion of the lighter-than-air fluid to fully or substantially fully inflate the balloon). However, the balloon system can additionally or alternatively ascend from any other suitable altitude. In examples, this low altitude range can be less than 0, 0.1, 0.2, 0.5, 1, 2, 5, 7, 10, 15, 20, 25, or 30 km above sea level, (e.g., at or substantially at ground level, such as near sea level or ground level at the site at which the balloon system launches and/or lands), but can alternatively be in any other suitable altitude range.

The high altitude range is preferably a stratospheric altitude range. In examples, the high altitude range can be more than 1, 2, 5, 7, 10, 15, 20, 25, 30, 35, 40, or 50 km above sea level (e.g., above 30 km or 100,000 ft), but can alternatively be in any other suitable altitude range. The balloon preferably inflates during ascent (e.g., due to the reduction in atmospheric air pressure during ascent), and preferably reaches a fully or substantially fully inflated state at the high altitude range (e.g., wherein the balloon remains substantially fully inflated while remaining in the high altitude range).

S210 can include descending from the high altitude range. The descent is preferably made to a tropospheric altitude range (e.g., less than 0, 0.1, 0.2, 0.5, 1, 2, 5, 7, 10, 15, or 20 km above sea level), such as to or near the Earth's surface, but can alternatively be made to a lower stratospheric altitude (e.g., less than 7, 10, 15, 20, 25, 30, 35, 40, or 50 km above sea level) or to any other suitable altitude. For example, the descent can be made in preparation for landing the balloon system. During descent, a majority of the lighter-than-air fluid is preferably retained within the balloon. Despite this retention, the balloon will typically partially deflate during the descent, due to the increase in atmospheric air pressure.

While operating the balloon system in flight S210, the balloon is preferably configured in a first mode. In the first mode, the balloon is preferably partially or fully inflated by the lighter-than-air fluid. In the first mode, the balloon portions are preferably mechanically connected to the apex fitting. For example, some or all load members of the balloon can be connected (e.g., proximal their respective apex ends) to (and/or by) the apex fitting. In the first mode, the apex fitting preferably holds the connected balloon portions in tension.

However, S210 can additionally or alternatively include any other suitable balloon system flight operations in any suitable balloon configurations.

4.2 Landing the Balloon System

The method can optionally include landing the balloon system S220, which can include controlling the balloon system (e.g., the payload thereof) to contact a landing surface (e.g., land, water, etc.). S220 can optionally include separating the payload from the balloon (before or after contacting the landing surface, such as before or after the payload contacts the landing surface). For example, S220 can include releasing a tether that mechanically couples the payload to the balloon, thereby releasing the balloon from the payload (e.g., wherein the untethered balloon will ascend under its reduced weight load).

In some examples, as the payload touches down, its weight is no longer held by the balloon, but the momentum of the balloon will cause the balloon to continue descending for some time. In these examples, the tether between the payload and balloon is not kept taut following the payload touchdown, and accordingly, the tension loads within the balloon are typically reduced. Absent a downward force exerted on the balloon by the payload, the balloon's excess buoyancy will then cause upward acceleration of the balloon, slowing its descent and then causing it to ascend again. In examples in which the balloon is not separated from the payload, the ascent will stop soon after the balloon ascends far enough to return tension to the tether (assuming the buoyant force from the lift gas is less than the gravitational force acting on the balloon system). Once the balloon's ascent is stopped and the tether is again taut, the tension loads exerted on the balloon by the tether are once again present.

However, S220 can additionally or alternatively include landing the balloon system in any other suitable manner.

4.3 Deflating the Balloon

Deflating the balloon S230 preferably functions to safely vent lift gas (e.g., all or substantially all lift gas) from the balloon. S230 preferably includes operating the apex fitting to transition from the first mode to a second mode. This transition preferably includes mechanically disconnecting balloon portions from each other (e.g., as described above in more detail, such as regarding the apex fitting 120). In examples, this can include splitting the apex fitting into multiple pieces, disconnecting one or more balloon portions from the apex fitting (e.g., unclamping balloon portions, cutting balloon portions at or near their connection to the apex fitting, etc.), and/or mechanically disconnecting balloon portions from each other in any other suitable manner. Optionally, this can additionally or alternatively include cutting the balloon envelope (e.g., reinforcement elements) at or near one or more boundaries between balloon portions. This preferably functions to create points of weakness (e.g., stress concentrators) at which balloon opening can initiate and/or propagate (e.g., wherein the balloon rips apart starting from these points of weakness). Cutting the balloon envelope in this manner can include severing one or more balloon elements (e.g., reinforcement elements) entirely, can include partially cutting one or more balloon elements (e.g., starting a tear from an edge of the balloon), and/or can include cutting the balloon envelope in any other suitable manner.

By operating the apex fitting to transition from the first mode to the second mode, the tension held between the balloon portions is preferably released. This can cause the balloon portions to tear apart from each other (e.g., rip open gores and/or connections between gores, such as connections sealed by load tapes). Accordingly, the balloon can open at the apex in response to this apex fitting transition, thereby causing the lighter-than-air fluid to vent from the opening. However, the balloon deflation can additionally or alternatively be initiated in any other suitable manner.

In a first embodiment, the balloon deflation is initiated before landing (e.g., before payload touchdown). In this embodiment, the deflation is preferably initiated while the balloon system is close above the landing site, but can alternatively be initiated at higher altitude (e.g., wherein a safety module, such as a parachute, parasail, or other element is deployed to slow descent of the payload before touchdown).

In a second embodiment, the balloon deflation is initiated after payload touchdown. In a first variation of this embodiment, it is initiated during the low-balloon tension period just after touchdown (e.g., when the tether between the payload and balloon is not taut). In a second variation, balloon deflation is initiated after tension returns to the tether, preferably at a time at which the balloon is displaced laterally from the payload such that it is not directly above the payload (e.g., a projection of the balloon along the gravity vector does not intersect the payload, is farther than a threshold distance from the payload such as more than 5, 10, 15, 20, 30, 50, 70, 100, 200, 300, or 500 m away, etc.). This lateral displacement preferably occurs due to wind forces acting on the balloon (e.g., wherein S230 includes waiting until wind displaces the balloon laterally from the payload before controlling the system to initiate balloon deflation). However, the displacement can additionally or alternatively be achieved by one or more lateral propulsion modules (e.g., lateral propulsion module of the payload and/or balloon).

However, S230 can additionally or alternatively be performed with any other suitable timing. Further, the method 200 can additionally or alternatively include operating the balloon system in any other suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

I claim:

1. A method for operating a balloon system comprising a balloon and a payload mechanically connected to the balloon, the method comprising, at the balloon system:
    while a lighter-than-air fluid is contained within the balloon, descending from an Earth stratosphere to an Earth troposphere, thereby partially deflating the balloon, wherein the balloon comprises:

an apex fitting arranged at an apex of the balloon, the apex fitting comprising a first portion and a second portion;

a first balloon portion mechanically connected to the first portion of the apex fitting; and a second balloon portion mechanically connected to the first balloon portion via the second portion of the apex fitting, wherein the apex fitting maintains a tension between the first and second balloon portions; and while in the Earth troposphere, while the balloon is partially deflated, at the apex fitting, mechanically disconnecting the first portion of the apex fitting from the second portion of the apex fitting, thereby releasing the tension between the first and second balloon portions and mechanically disconnecting the first balloon portion from the second balloon portion, wherein, in response to mechanically disconnecting the first balloon portion from the second balloon portion, the balloon opens and the lighter-than-air fluid vents from the balloon.

2. The method of claim 1, wherein descending from the Earth stratosphere to the Earth troposphere comprises landing the payload such that the payload is at least partially supported by a surface of the Earth, wherein mechanically disconnecting the first balloon portion from the second balloon portion is performed while the payload is at least partially supported by the surface.

3. The method of claim 2, wherein the surface is a surface of a body of water.

4. The method of claim 2, wherein:

while the balloon system is in the Earth stratosphere, a mechanical connection between the payload and the balloon is under a first tension;

after landing the payload, the mechanical connection is under reduced tension as compared with the first tension; and mechanically disconnecting the first balloon portion from the second balloon portion is performed while the mechanical connection is under reduced tension.

5. The method of claim 2, wherein mechanically disconnecting the first balloon portion from the second balloon portion is performed while a projection of the balloon along a gravity vector does not intersect the payload.

6. The method of claim 1, further comprising, while in the Earth troposphere, before mechanically disconnecting the first balloon portion from the second balloon portion, mechanically uncoupling the payload from the balloon.

7. The method of claim 1, further comprising, at the balloon system, while the lighter-than-air fluid is contained within the balloon, before descending from the Earth stratosphere to the Earth troposphere, ascending from the Earth troposphere to the Earth stratosphere.

8. The method of claim 1, wherein, while the balloon system is in the Earth stratosphere, the balloon is substantially fully inflated.

9. The method of claim 1, wherein:

while in the Earth stratosphere, the balloon defines a first volume; and while in the Earth troposphere, after descending to the Earth troposphere and before mechanically disconnecting the first balloon portion from the second balloon portion, the balloon defines a second volume, wherein the first volume is greater than the second volume by a factor greater than 10.

10. The method of claim 1, wherein the lighter-than-air fluid comprises molecular hydrogen gas.

11. The method of claim 1, wherein:

the first balloon portion comprises a first plurality of gores; and the second balloon portion comprises a second plurality of gores.

12. The method of claim 11, wherein:

the balloon defines a central axis between the apex and a nadir of the balloon;

the balloon further comprises a reinforcement portion encircling the central axis, wherein the first and second balloon portions are mechanically connected to the apex fitting via the reinforcement portion; and mechanically disconnecting the first balloon portion from the second balloon portion comprises:

at the apex fitting, releasing at least one of the first balloon portion or the second balloon portion; and cutting the reinforcement portion proximal a boundary between the first and second balloon portions.

13. A balloon system comprising a balloon configured to contain a lighter-than-air fluid, the balloon comprising:

a plurality of gores substantially defining a balloon envelope;

a plurality of load members comprising a first set of load members and a second set of load members; and an apex fitting arranged at a balloon apex, the apex fitting comprising a first apex member attached to the first set of load members and a second apex member attached to the second set of load members;

wherein:

the first and second sets of load members are disjoint;

each load member of the plurality defines an apex end and a nadir end opposing the apex end along a length of the load member;

each load member of the plurality mechanically connects a respective pair of adjacent gores along a length of the gores;

in a first mode, the balloon is partially inflated by the lighter-than-air fluid and each load member of the plurality is mechanically connected to the apex fitting proximal the apex end of the load member, thereby holding each load member of the plurality in tension;

in the first mode, the first apex member is mechanically connected to the second apex member;

the apex fitting is operable to transition the balloon from the first mode to a second mode by mechanically disconnecting the first set of load members from the second set of load members, the apex fitting is operable to mechanically decouple the first set of load members from the second set of load members by detaching the first apex member from the second apex member, wherein, in response to mechanically disconnecting the first set of load members from the second set of load members, the balloon opens and the lighter-than-air fluid vents from the balloon.

14. The balloon system of claim 13, wherein:

the plurality of load members further comprises a third set of load members disjoint from the first and second sets of load members;

the apex fitting further comprises a third apex member attached to the third set of load members;

in the first mode, the third apex member is mechanically connected to the first apex member; and transitioning the balloon from the first mode to the second mode further comprises mechanically decoupling the third set of load members from the first and second sets of load members, comprising detaching the first apex member from the third apex member.

15. The balloon system of claim 13, wherein the apex fitting further comprises a wax motor operable to detach the first apex member from the second apex member.

16. The balloon system of claim 13, wherein:
the balloon defines a central axis between the balloon apex and a balloon nadir;
the balloon further comprises a reinforcement portion encircling the central axis, wherein each load member of the plurality is mechanically connected to the apex fitting via the reinforcement portion;
the apex fitting comprises a blade; and
transitioning the balloon from the first mode to the second mode comprises cutting the reinforcement portion proximal a boundary between the first and second sets of load members.

17. The balloon system of claim 13, wherein the gores comprise a polymer film.

18. The balloon system of claim 13, wherein the balloon is a zero-pressure balloon.

19. The balloon system of claim 13, further comprising a payload tethered to the balloon.

20. A method for operating a balloon system comprising a balloon and a payload mechanically connected to the balloon, the method comprising, at the balloon system:
while a lighter-than-air fluid is contained within the balloon, descending from an Earth stratosphere to an Earth troposphere, thereby partially deflating the balloon, wherein descending from the Earth stratosphere to the Earth troposphere comprises landing the payload such that the payload is at least partially supported by a surface of the Earth, wherein the balloon comprises:
an apex fitting arranged at an apex of the balloon;
a first balloon portion mechanically connected to the apex fitting; and
a second balloon portion mechanically connected to the first balloon portion via the apex fitting, wherein the apex fitting maintains a tension between the first and second balloon portions; and
while in the Earth troposphere, while the balloon is partially deflated, at the apex fitting, mechanically disconnecting the first balloon portion from the second balloon portion, thereby releasing the tension between the first and second balloon portions, wherein, in response to mechanically disconnecting the first balloon portion from the second balloon portion, the balloon opens and the lighter-than-air fluid vents from the balloon, wherein mechanically disconnecting the first balloon portion from the second balloon portion is performed while the payload is at least partially supported by the surface.

21. The method of claim 20, wherein the surface is a surface of a body of water.

22. The method of claim 20, wherein:
while the balloon system is in the Earth stratosphere, a mechanical connection between the payload and the balloon is under a first tension;
after landing the payload, the mechanical connection is under reduced tension as compared with the first tension; and
mechanically disconnecting the first balloon portion from the second balloon portion is performed while the mechanical connection is under reduced tension.

23. The method of claim 20, wherein mechanically disconnecting the first balloon portion from the second balloon portion is performed while a projection of the balloon along a gravity vector does not intersect the payload.

* * * * *